US012775244B2

(12) United States Patent
Zhang

(10) Patent No.: US 12,775,244 B2
(45) Date of Patent: Oct. 27, 2026

(54) CLOCK DISPLAY METHOD, COMPUTER DEVICE AND STORAGE MEDIUM

(71) Applicant: Glenfly Tech Co., Ltd., Shanghai (CN)

(72) Inventor: Diansheng Zhang, Shanghai (CN)

(73) Assignee: GLENFLY TECH CO., LTD., Shanghai (CN)

( * ) Notice: Subject to any disclaimer, the term of this patent is extended or adjusted under 35 U.S.C. 154(b) by 290 days.

(21) Appl. No.: 18/598,768

(22) Filed: Mar. 7, 2024

(65) Prior Publication Data

US 2024/0310790 A1 Sep. 19, 2024

(30) Foreign Application Priority Data

Mar. 14, 2023 (CN) ......................... 202310251732.7

(51) Int. Cl.
*G04G 9/02* (2006.01)
*G06T 3/60* (2024.01)
(Continued)

(52) U.S. Cl.
CPC ................. *G04G 9/02* (2013.01); *G06T 3/60* (2013.01); *G06T 11/00* (2013.01); *G09G 5/003* (2013.01)

(58) Field of Classification Search
CPC .. G04G 9/02; G04G 9/00; G04G 5/00; G04G 21/00; G06T 3/60; G06T 11/00; G09G 5/003; G09G 5/377
See application file for complete search history.

(56) References Cited

U.S. PATENT DOCUMENTS

2015/0009189 A1* 1/2015 Nagara .................. G09G 3/003
345/82
2017/0255169 A1 9/2017 Lee et al.
(Continued)

FOREIGN PATENT DOCUMENTS

CN 101488007 A 7/2009
CN 104765266 A 7/2015
(Continued)

OTHER PUBLICATIONS

English translation of CN-104765266-A (Year: 2015).*
(Continued)

*Primary Examiner* — Xiao M Wu
*Assistant Examiner* — Latrell Anthony Creary
(74) *Attorney, Agent, or Firm* — Nixon Peabody LLP

(57) ABSTRACT

A clock display method, a computer device, a storage medium are provided. The method includes: performing time calibration by display driver chip based on local temporal information and processor temporal information to obtain calibrated temporal information; determining rotation angles of respective hand graphics forming display clock face according to the calibrated temporal information; retrieving a clock face image with no hands and at least one hand graphic which are locally stored; overlaying the at least one hand graphic onto the clock face image with no hands according to rotation angle of each hand graphic to obtain a clock face image corresponding to the calibrated temporal information; obtaining a background image issued by video processor, overlaying the clock face image onto the background image to obtain display clock face data, then transmitting the display clock face data to display screen to show the calibrated temporal information.

17 Claims, 4 Drawing Sheets

(51) Int. Cl.
*G06T 11/00* (2026.01)
*G09G 5/00* (2006.01)

(56) References Cited

U.S. PATENT DOCUMENTS

| | | | | |
|---|---|---|---|---|
| 2018/0061308 | A1* | 3/2018 | Bae | G09G 5/393 |
| 2019/0121300 | A1 | 4/2019 | Peterson et al. | |

FOREIGN PATENT DOCUMENTS

| | | | |
|---|---|---|---|
| CN | 106919354 | A | 7/2017 |
| CN | 109782563 | A | 5/2019 |
| CN | 110235066 | A | 9/2019 |
| CN | 113805465 | A | 12/2021 |
| CN | 115543514 | A | 12/2022 |
| JP | 2010243334 | A | 10/2010 |
| KR | 102219674 | B1 | 2/2021 |

OTHER PUBLICATIONS

English translation of CN-113805465-A (Year: 2021).*
Notice of Allowance for CN202310251732.7, dated Oct. 21, 2024 (5 pages).
Chinese Office Action for App. No. 202310251732.7, mailed Mar. 28, 2024 (15 pages) [Machine Translated].

* cited by examiner

CLOCK DISPLAY METHOD, COMPUTER DEVICE AND STORAGE MEDIUM

This application claims priority under 35 U.S.C. § 119 to Chinese Patent Application No. 202310251732.7, filed on Mar. 14, 2023, the entire content of which is incorporated herein in its entirety.

TECHNICAL FIELD

The present application relates to the technical field of display driver Integrated Circuit (IC), and more particularly, relates to a clock display method, a clock display apparatus, a computer device, a storage medium and a computer program product.

BACKGROUND

Currently, there are two types of clock display methods in tablet display devices: one method using Arabic numerals and another method using an analog clock with clock face and clock hands. The clock display method using Arabic numerals is relatively simple and may be implemented using a local bitmap font library. In the display method using analog clock with clock face and clock hands, it is common for a system processor (AP/GPU) to calculate and generate an image of analog clock with clock face and clock hands, which are then blended with a background image, loaded into the GPU frame buffer, sent through a high-speed interface to a display controller (scalar/monitor controller) or to a display driver integrated circuit (DDIC), and then displayed on the panel. This method allows customers to customize clock face and clock hands as desired, but it requires constant refreshing of local frame buffer, which consumes a lot of power through the high-speed interface, resulting in high device power consumption when the screen is in a sleep-in mode.

In conventional technologies, image generation and complex algorithm processing may only be accomplished by powerful processors or graphics processors (referred to as CPU/GPU). However, with the industrial upgrade of display driver integrated circuits, more and more functions need to be, and are preferably, integrated into the display driver integrated circuits. In this way, the CPU/GPU can be liberated, which may improve the overall performance of the CPU/GPU and add more other functions such as sensor hubs, health management into the system.

At present, the clock display method using analog clock with clock face and clock hands requires high load on the CPU/GPU of the device, resulting in high overall power consumption of the device.

SUMMARY

In view of the above, a clock display method, a clock display apparatus, a computer device, a computer readable storage medium and a computer program product are provided, which may decrease an overall power consumption of the device.

In a first aspect, a clock display method is provided by the present disclosure, which is applied to a display driver chip for a display screen, the display driver chip communicates with a video processor, the method includes:

performing a time calibration based on local temporal information and processor temporal information and obtaining calibrated temporal information;

determining rotation angles of respective hand graphics that form a display clock face according to the calibrated temporal information;

retrieving a clock face image with no hands and at least one hand graphic which are locally stored, overlaying the at least one hand graphic onto the clock face image with no hands according to the rotation angle of each hand graphic and obtaining a clock face image corresponding to the calibrated temporal information;

obtaining a background image issued by the video processor, overlaying the clock face image onto the background image to obtain display clock face data, then transmitting the display clock face data to the display screen to show the calibrated temporal information.

In accordance with an embodiment, determining the rotation angles of the respective hand graphics that form the display clock face according to the calibrated temporal information includes:

retrieving correspondences between the rotation angles of the respective hand graphics and different time from a locally stored table of angle-tempor correspondences; and determining the rotation angles of the respective hand graphics corresponding to the calibrated temporal information according to the correspondences between the rotation angles of the respective hand graphics and different time.

In accordance with an embodiment, determining the rotation angles of the respective hand graphics corresponding to the calibrated temporal information according to the correspondences between the rotation angles of the respective hand graphics and different time include:

rotating each hand graphic according to the rotation angle of the each hand graphic corresponding to the calibrated temporal information, and performing anti-aliasing on each rotated hand graphic to obtain a hand graphic layer;

determining a clock face layer in which the clock face image with no hands is located, and obtaining the clock face image corresponding to the calibrated temporal information by overlaying each hand graphic layer onto the clock face layer.

In accordance with an embodiment, overlaying the each hand graphic layer onto the clock face layer includes:

obtaining locally stored layer configuration parameters, and determining display priorities of the each hand graphic layer and the clock face layer based on the layer configuration parameters;

overlaying the each hand graphic layer onto the clock face layer according to the display priorities.

In accordance with an embodiment, the method further includes:

obtaining the clock face image with no hands, the at least one hand graphic and the layer configuration parameters which are all issued by the video processor;

storing the at least one hand graphic in a first local storage area, storing the clock face image with no hands in a second local storage area, and storing the layer configuration parameters in a local configuration storage area.

In accordance with an embodiment, performing the time calibration based on the local temporal information and the processor temporal information and obtaining the calibrated temporal information include:

obtaining the local temporal information of the display driver chip, receiving the processor temporal information issued by the video processor, and obtaining a video synchronization signal generated by the video processor;

performing the time calibration based on the local temporal information, the processor temporal information and the video synchronization signal and obtaining the calibrated temporal information.

In accordance with an embodiment, prior to transmitting the display clock face data to the display screen, the clock display method further includes:

obtaining a data latency corresponding to the display clock face data;

re-generating a new video synchronization signal based on the video synchronization signal and the data latency.

Accordingly, transmitting the display clock face data to the display screen includes:

transmitting the new video synchronization signal and the display clock face data to the display screen.

In a second aspect, a clock display apparatus is further provided by the present disclosure. The apparatus includes:

a time calibration module, which is configured to perform a time calibration based on local temporal information and processor temporal information to obtain calibrated temporal information;

an angle calculation module, which is configured to determine rotation angles of respective hand graphics that form a display clock face according to the calibrated temporal information;

a first overlay module, which is configured to: retrieve a clock face image with no hands and at least one hand graphic which are locally stored, overlay the at least one hand graphic onto the clock face image with no hands according to the rotation angle of each hand graphic, and obtain a clock face image corresponding to the calibrated temporal information; and a second overlay module, which is configured to: obtain a background image issued by a video processor, overlay the clock face image onto the background image to obtain display clock face data, then transmit the display clock face data to a display screen to show the calibrated temporal information.

In a third aspect, a computer device is further provided by the present disclosure. The computer device includes a memory and a processor, and a computer program is stored in the memory. The processor, when executing the computer program, implements:

performing a time calibration based on local temporal information and processor temporal information to obtain calibrated temporal information;

determining rotation angles of respective hand graphics that form a display clock face according to the calibrated temporal information;

retrieving a clock face image with no hands and at least one hand graphic which are locally stored, overlaying the at least one hand graphic onto the clock face image with no hands according to the rotation angle of each hand graphic to obtain a clock face image corresponding to the calibrated temporal information;

obtaining a background image issued by a video processor, overlaying the clock face image onto the background image to obtain display clock face data, then transmitting the display clock face data to a display screen to show the calibrated temporal information.

In a fourth aspect, a computer readable storage medium is further provided by the present disclosure, storing thereon a computer program. The computer program, when executed by a processor, causes the processor to implement:

performing a time calibration based on local temporal information and processor temporal information to obtain calibrated temporal information;

determining rotation angles of respective hand graphics that form a display clock face according to the calibrated temporal information;

retrieving a clock face image with no hands and at least one hand graphic which are locally stored, overlaying the at least one hand graphic onto the clock face image with no hands according to the rotation angle of each hand graphic to obtain a clock face image corresponding to the calibrated temporal information;

obtaining a background image issued by a video processor, overlaying the clock face image onto the background image to obtain display clock face data, then transmitting the display clock face data to a display screen to show the calibrated temporal information.

In a fifth aspect, a computer program product is further provided by the present disclosure. The computer program product includes a computer program, and the computer program, when executed by a processor, causes the processor to implement:

performing a time calibration based on local temporal information and processor temporal information to obtain calibrated temporal information;

determining rotation angles of respective hand graphics that form a display clock face according to the calibrated temporal information;

retrieving a clock face image with no hands and at least one hand graphic which are locally stored, overlaying the at least one hand graphic onto the clock face image with no hands according to the rotation angle of each hand graphic to obtain a clock face image corresponding to the calibrated temporal information;

obtaining a background image issued by a video processor, overlaying the clock face image onto the background image to obtain display clock face data, then transmitting the display clock face data to a display screen to show the calibrated temporal information.

With the above-mentioned clock display method, clock display apparatus, computer device, storage medium and computer program product, the display driver chip performs a time calibration based on local temporal information and processor temporal information to obtain calibrated temporal information, determines rotation angles of respective hand graphics that form a display clock face according to the calibrated temporal information, retrieves a clock face image with no hands and at least one hand graphic which are locally stored, overlays the at least one hand graphic onto the clock face image with no hands according to the rotation angle of each hand graphic to obtain a clock face image corresponding to the calibrated temporal information, obtains a background image issued by the video processor, overlays the clock face image onto the background image to obtain display clock face data, then transmits the display clock face data to a display screen to show the calibrated temporal information. The display driver chip is able to independently display an analog clock with clock face and clock hands, thereby greatly reducing dependence on the processor and graphics processor. The processor and graphics processor only need to transmit the temporal information, the hand graphics and the clock face image to the display driver chip; alternatively, the temporal information, the hand graphics and the clock face image can be obtained by the display driver chip from a local interface. The data processing for generating the clock face image is completed by the display driver chip, which can reduce operating loads of the processor and graphics processor, thereby reducing an overall power consumption of the device.

DETAILED DESCRIPTION OF THE EMBODIMENTS

In order to make the objectives, technical solutions and advantages of the present disclosure clearer, the present disclosure is further detailed hereinafter according to embodiments in conjunction with accompanying drawings. It should be understood that particular embodiments described in the specification are merely intended to interpret the present disclosure rather than to limit the present disclosure.

Figure 1:
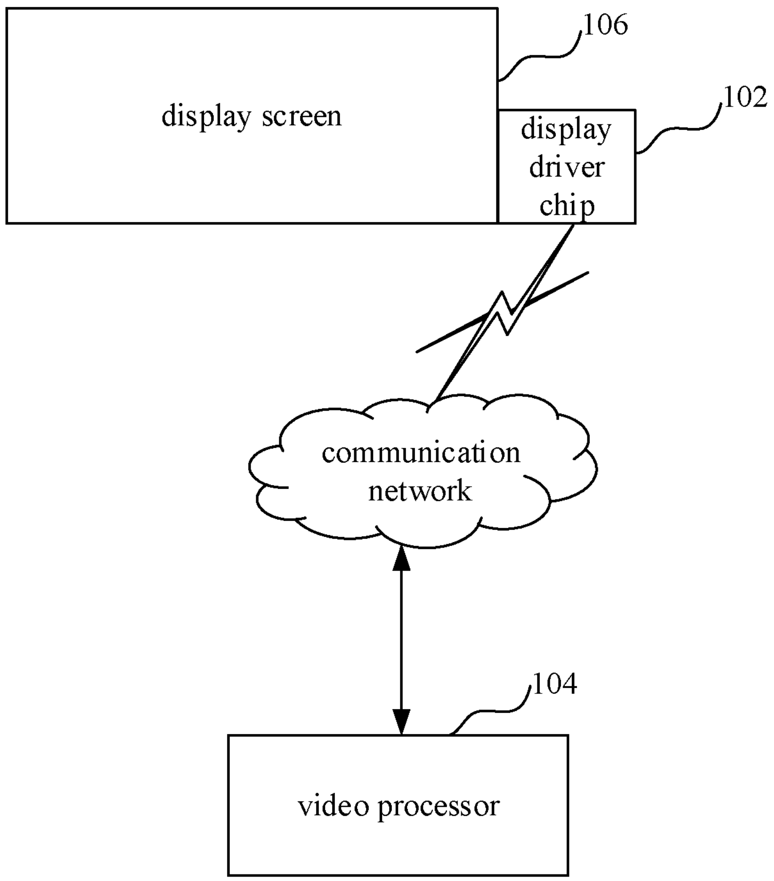
FIG. 1 schematically illustrates an application environment of a clock display method according to an embodiment.

A clock display method provided by an embodiment of the present disclosure may be applied to an application environment as shown in FIG. 1. A terminal is provided with a display driver chip 102, a video processor 104 and a display screen 106. The display driver chip 102 is arranged on the display screen 106, and is able to communicate with the video processor 104. The video processor 104 may be a CPU, a GPU, or a combination of a CPU and a GPU. The terminal may be but is not limited to various types of personal computers, laptops, smartphones, tablets, Internet of Things (IoT) devices and portable wearable devices. The IoT devices may include smart speakers, smart TVs, smart air conditioners, smart vehicle-mounted devices, and the like. The portable wearable devices may include smart watches, smart bracelets, headset devices, and the like.

Figure 2:
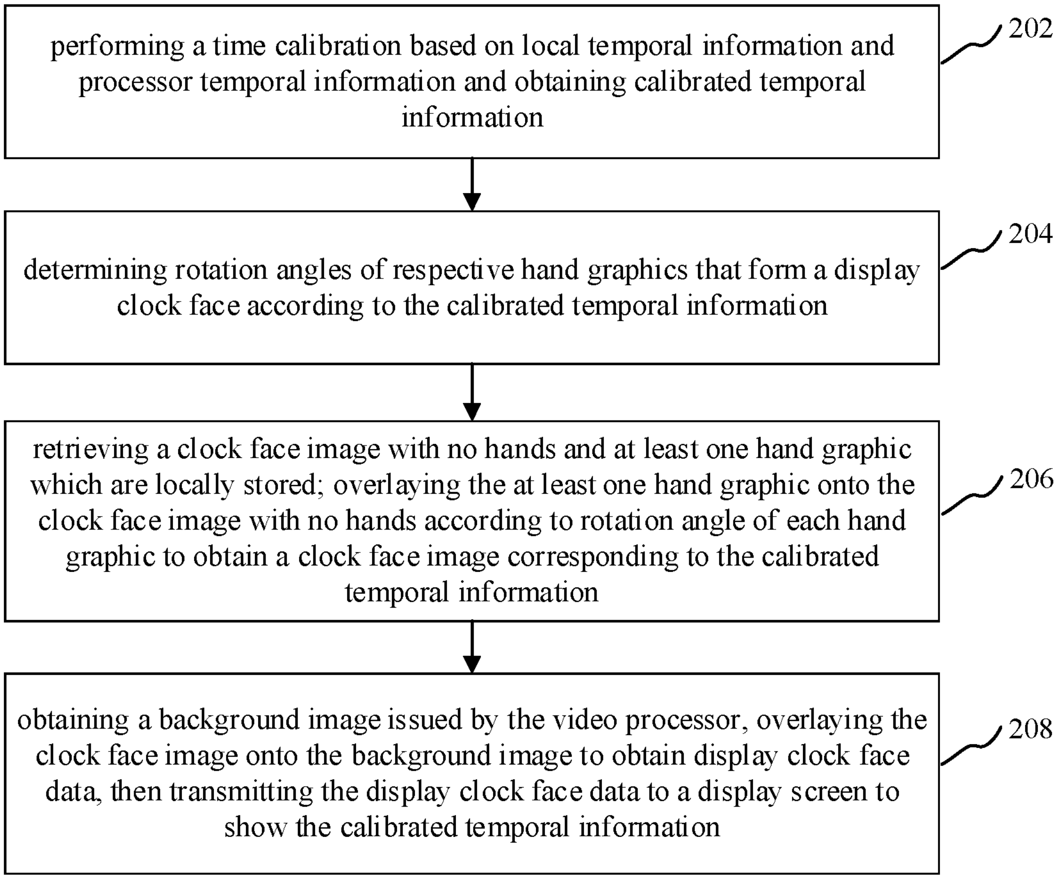
FIG. 2 is a schematic flow chart of a clock display method according to an embodiment.

According to an embodiment, as shown in FIG. 2, a clock display method is provided. Based on application to the display driver chip 102 in FIG. 1 as an example for illustration, the clock display method includes the following steps.

Step 202 includes: performing a time calibration based on local temporal information and processor temporal information and obtaining calibrated temporal information.

Optionally, the display driver chip obtains current local temporal information using a local clock, receives current processor temporal information from the video processor as a standard time, performs calibration on the local temporal information based on the processor temporal information, and obtains current calibrated temporal information.

The local clock of the display driver chip may be implemented by a local crystal oscillator, achieving a local timing and counting function.

Step 204 includes: determining rotation angles of respective hand graphics that form a display clock face according to the calibrated temporal information.

The hand graphics may include an hour hand graphic, a minute hand graphic and a second hand graphic.

Optionally, the display driver chip reads a locally stored table of angle-tempor correspondences each time receiving calibrated temporal information. The table records a correspondence between rotation angles of the hour hand graphic and different time, a correspondence between rotation angles of the minute hand graphic and different time, and a correspondence between rotation angles of the second hand graphic and different time. Based on the current calibrated temporal information, the display driver chip retrieves rotation angles of the hour hand graphic, the minute hand graphic, and the second hand graphic which match a current moment from the table of angle-tempor correspondences.

Step 206 includes: retrieving a clock face image with no hands and at least one hand graphic which are locally stored, overlaying the at least one hand graphic onto the clock face image with no hands according to the rotation angle of each hand graphic, and obtaining a clock face image corresponding to the calibrated temporal information.

The clock face image with no hands and hand graphics may be customized in the video processor and then transmitted to the display driver chip in advance for storage. When it is needed to display an analog clock having a clock face and clock hands on the display screen, the display driver chip directly retrieves the clock face image with no hands and the hand graphics from a local storage. Types of the hand graphics and their corresponding parameters may have following configurations: long stick hand, hand length and hand width, and hand color; Breguet hand, hand length, widths of two sections of the Breguet hand, radius of a decorative ring/dot on the Breguet hand, and hand color; a ring which is embedded on the hand and arranged around an axis of the hand, an inner radius and an outer radius of the ring, and ring color; and so on.

Optionally, the display driver chip rotates respective hand graphics according to the rotation angles of the respective hand graphics corresponding to the calibrated temporal information, and performs anti-aliasing processing on respective rotated hand graphics. The display driver chip then obtains hand graphic layers based on respective hand graphics after rotation and anti-aliasing processing. The display driver chip determines a clock face layer in which the clock face image with no hands is located, and obtains the clock face image corresponding to the calibrated temporal information by overlaying the respective hand graphic layers onto the clock face layer.

Step 208 includes: obtaining a background image issued by the video processor, overlaying the clock face image onto the background image to obtain display clock face data, then transmitting the display clock face data to the display screen to show the calibrated temporal information.

Optionally, the display driver chip receives a background image of a clock face that needs to be displayed currently from the video processor, overlays the clock face image and the background image to obtain a final display clock face data to be displayed at the current moment, and transmits the display clock face data to the display screen to integrally display a clock face graphic, the hour hand graphic, the minute hand graphic, the second hand graphic, and the background image to represent the current moment.

According to an embodiment, the clock display method further includes: after retrieving the calibrated temporal information, updating local hands position to main system time with noticeable abrupt change.

In the above-mentioned clock display method, the display driver chip performs a time calibration based on local temporal information and processor temporal information to obtain calibrated temporal information; determines rotation angles of respective hand graphics that form a display clock face according to the calibrated temporal information; retrieves a clock face image with no hands and at least one hand graphic which are locally stored, and overlays the at least one hand graphic onto the clock face image with no hands according to the rotation angle of each hand graphic to obtain a clock face image corresponding to the calibrated temporal information; obtains a background image issued by the video processor, overlays the clock face image onto the background image to obtain display clock face data, then transmits the display clock face data to a display screen to show the calibrated temporal information. The display driver chip is able to independently display an analog clock with clock face and clock hands, thereby greatly reducing dependence on processor and graphics processor. The processor and graphics processor only need to transmit temporal information, hand graphics and clock face image to the display driver chip. Data processing for generating clock face image is completed by the display driver chip, which can reduce operating loads of the processor and graphics processor, thereby reducing an overall power consumption of the device.

According to an embodiment, determining the rotation angles of the respective hand graphics that form the display clock face according to the calibrated temporal information includes: retrieving correspondences between rotation angles of respective hand graphics and different time from the locally stored table of angle-tempor correspondences; determining the rotation angles of the respective hand graphics corresponding to the calibrated temporal information according to the correspondences between the rotation angles of the respective hand graphics and different time.

The table of angle-tempor correspondences is edited and stored locally in the display driver chip in advance, and records the correspondence between the rotation angles of the hour hand graphic and different time, the correspondence between the rotation angles of the minute hand graphic and different time, and the correspondence between the rotation angles of the second hand graphic and different time, with rotation angles ranging from 0 degrees to 360 degrees. For example, when the current moment is 12:00 or 0:00, corresponding rotation angles of the hour hand graphic, the minute hand graphic, and the second hand graphic are all 0 degrees; when the current moment is 3:00, a corresponding rotation angle of the hour hand graphic is 90 degrees, and corresponding rotation angles of the minute hand graphic and the second hand graphic are both 0 degrees; when the current moment is 6:30:10, corresponding rotation angles of the hour hand graphic, the minute hand graphic and the second hand graphic are 195 degrees, 30 degrees and 60 degrees, respectively.

Specifically, the display driver chip retrieves the correspondence between the rotation angles of the hour hand graphic and different time, the correspondence between the rotation angles of the minute hand graphic and different time, and the correspondence between the rotation angles of the second hand graphic and different time from the locally stored table of angle-tempor correspondences; determines a hour hand rotation angle of the hour hand graphic corresponding to the calibrated temporal information based on the correspondence between the rotation angles of the hour hand graphic and different time; determines a minute hand rotation angle of the minute hand graphic corresponding to the calibrated temporal information based on the correspondence between the rotation angles of the minute hand graphic and different time; and determines a second hand rotation angle of the second hand graphic corresponding to the calibrated time information based on the correspondence between the rotation angles of the second hand graphic and different time.

In a feasible implementation, the display driver chip obtains the table of angle-tempor correspondences issued by the video processor and stores the table in a local table storage area.

According to the embodiment, correspondences between rotation angles of respective hand graphics and different time are retrieved from a locally stored table of angle-tempor correspondences; rotation angles of respective hand graphics corresponding to the calibrated temporal information are determined according to the correspondences between the rotation angles of respective hand graphics and different time. This greatly reduces dependence on the processor and graphics processor as the display driver chip is able to calculate a rotation angle of each hand graphic at each moment. The processor and graphics processor only need to transmit the temporal information, the hand graphics and the clock face image to the display driver chip, which can reduce operating loads of the processor and graphics processor, thereby reducing an overall power consumption of the device.

According to an embodiment, overlaying the at least one hand graphic onto the clock face image with no hands according to the rotation angle of each hand graphic and obtaining the clock face image corresponding to the calibrated temporal information include: rotating each hand graphic according to the rotation angle of the hand graphic corresponding to the calibrated temporal information, and performing anti-aliasing on each rotated hand graphic to obtain a hand graphic layer; determining a clock face layer in which the clock face image with no hands is located; obtaining locally stored layer configuration parameters, and determining display priorities of each hand graphic layer and the clock face layer based on the layer configuration parameters; overlaying the each hand graphic layer onto the clock face layer according to the display priorities; and obtaining the clock face image corresponding to the calibrated temporal information by overlaying the each hand graphic layer onto the clock face layer.

Optionally, the display driver chip retrieves an hour hand graphic, a minute hand graphic, and a second hand graphic which are locally stored; rotates the hour hand graphic according to a hour hand rotation angle, and performs anti-aliasing on the rotated hour hand graphic to obtain an hour hand graphic layer; rotates the minute hand graphic according to a minute hand rotation angle, and performs anti-aliasing on the rotated minute hand graphic to obtain a minute hand graphic layer; and rotates the second hand graphic according to a minute hand rotation angle and performs anti-aliasing on the rotated second hand graphic to obtain a second hand graphic layer. The display driver chip retrieves a clock face image with no hands that is stored locally and obtain a clock face layer where the clock face image with no hands is located; here, if the clock face image with no hands stored locally is compressed, it is first decompressed. Then, based on the layer configuration parameters which are stored locally, the display driver chip determines respective display priorities of the hour hand graphic layer, the minute hand graphic layer, the second hand graphic layer, and the clock face layer, where the clock face layer has a lowest display priority, and a layer with a relatively high display priority overlays a layer with a relatively low display priority. A clock face image representing a current moment may be obtained by overlaying the hour hand graphic layer, the minute hand graphic layer, the second hand graphic layer and the clock face layer according to the display priorities. A rotated hand graphic may have strong aliasing effect, so an anti-aliasing processing is required. An anti-aliasing blending should be performed by blending the rotated hand graphic with the clock face image with no hands using a blending coefficient, thereby eliminating the aliasing effect, where the blending coefficient may be a distance from an edge of the rotated hand graphic to an edge of a rotated-back-to original graphic.

According to a feasible implementation, the layer configuration parameters further include layer transparency of the hour hand graphic layer, layer transparency of the minute hand graphic layer, layer transparency of the second hand graphic layer, and layer transparency of the clock face layer.

According to the embodiment, each hand graphic is rotated according to the rotation angle of each hand graphic corresponding to the calibrated temporal information, and anti-aliasing is performed on each rotated hand graphic to obtain a hand graphic layer; a clock face layer in which the clock face image with no hands is located is determined, locally stored layer configuration parameters are obtained, and display priorities of each hand graphic layer and the clock face layer are determined based on the layer configuration parameters; and the each hand graphic layer is overlayed onto the clock face layer according to the display priorities. A clock face image corresponding to the calibrated temporal information is obtained by overlaying the each hand graphic layer onto the clock face layer. The display driver chip is able to rotate each hand graphic and to perform anti-aliasing blending processing on each rotated hand graphic and the clock face image with no hands, thereby greatly reducing dependence on the processor and graphics processor. The processor and graphics processor only need to transmit the temporal information, the hand graphics and the clock face image to the display driver chip, which can reduce operating loads of the processor and graphics processor, thereby reducing an overall power consumption of the device.

According to an embodiment, the clock display method further includes: obtaining the clock face image with no hands, the at least one hand graphic, and the layer configuration parameters which are issued by the video processor; storing the at least one hand graphic in a first local storage area, storing the clock face image with no hands in a second local storage area, and storing the layer configuration parameters in a local configuration storage area.

Optionally, the display driver chip is provided with at least four storage areas. The clock face image with no hands, the hour hand graphic, the minute hand graphic, the second hand graphic, the layer configuration parameters and the table of angle-tempor correspondences are obtained in advance from the video processor. The hour hand graphic, the minute hand graphic and the second hand graphic are stored in the first local storage area, the clock face image with no hands is stored in the second local storage area, the layer configuration parameters are stored in the local configuration storage area, and the table of angle-tempor first local storage area is stored in the local table storage area.

According to the embodiment, the processor and the graphics processor pre-transmit the clock face image with no hands, the hour hand graphic, the minute hand graphic, the second hand graphic, the layer configuration parameters, and the table of angle-tempor correspondences to the display driver chip. During the process of generating the clock face image of the analog clock by the display driver chip, the processor and the graphics processor only need to transmit time information to the display driver chip, which reduces operating loads of the processor and the graphics processor, thereby reducing the overall power consumption of the device.

According to an embodiment, performing the time calibration based on the local temporal information and the processor temporal information and obtaining the calibrated temporal information include: obtaining the local temporal information of the display driver chip, receiving the processor temporal information issued by the video processor, and obtaining a video synchronization signal generated by the video processor; performing the time calibration based on the local temporal information, the processor temporal information and the video synchronization signal and obtaining the calibrated temporal information.

Optionally, the display driver chip uses a local clock to obtain current local temporal information; at the same time, the display driver chip receives current processor temporal information from the video processor and receives the video synchronization signal from the display screen. The video synchronization signal carries a video clock. Based on the processor temporal information and the video clock, the display driver chip calibrates the local temporal information and obtains current calibrated temporal information.

According to the embodiment, local temporal information of the display driver chip is obtained, processor temporal information issued by the video processor is received, and a video synchronization signal generated by the display screen is obtained; a time calibration is performed based on the local temporal information, the processor temporal information and the video synchronization signal to obtain calibrated temporal information. The display driver chip calibrates the local time based on the standard time of the processor and the video clock of the display screen, which can obtain relatively accurate temporal information.

According to an embodiment, before transmitting the display clock face data to the display screen, the clock display method further includes: obtaining a data latency corresponding to the display clock face data, re-generating a new video synchronization signal based on the video synchronization signal and the data latency. Accordingly, transmitting the display clock face data to the display screen includes: transmitting the new video synchronization signal and the display clock face data to the display screen.

Optionally, after the hands graphics are rotated and overlayed onto the clock face image with no hands, the data latency of the image alters, thus a new video synchronization signal needs to be generated. The display driver chip synchronously transmits the new video synchronization signal and the display clock face data to the display screen, and the display screen displays the clock face image, the hour hand graphic, the minute hand graphic, the second hand graphic and the background image together to represent the current moment.

According to the embodiment, a data latency corresponding to the display clock face data is obtained, a new video synchronization signal is re-generated based on the video synchronization signal and the data latency. Accordingly, transmitting the display clock face data to the display screen includes: transmitting the new video synchronization signal and the display clock face data to the display screen. The processor and the graphics processor do not need to process the video synchronization signal, which reduces operating loads of the processor and the graphics processor, thereby reducing the overall power consumption of the device.

A clock display method is provided according to an embodiment, applied to a display driver chip of a display screen. The display driver chip communicates with a video processor. The clock display method includes:

obtaining a clock face image with no hands, an hour hand graphic, a minute hand graphic, a second hand graphic, layer configuration parameters and a table of angle-tempor correspondences which are issued by the video processor; storing the hour hand graphic, the minute hand graphic and the second hand graphic in a first local storage area, storing the clock face image with no hands in a second local storage area, storing the layer configuration parameters in a local configuration storage area, and storing the table of angle-tempor correspondences in a local table storage area;

obtaining local temporal information of the display driver chip, receiving processor temporal information issued by the video processor, and obtaining a video synchronization signal generated by the video processor; performing a time calibration based on the local temporal information, the processor temporal information and the video synchronization signal to obtain calibrated temporal information;

retrieving correspondences between rotation angles of respective hand graphics and different time from the locally stored table of angle-tempor correspondences; determining rotation angles of the respective hand graphics corresponding to the calibrated temporal information according to the correspondences between the rotation angles of the respective hand graphics and different time;

retrieving the clock face image with no hands and at least one hand graphic which are locally stored, rotating each hand graphic according to the rotation angle of the hand graphic corresponding to the calibrated temporal information, and performing anti-aliasing on each rotated hand graphic to obtain a hand graphic layer; determining a clock face layer in which the clock face image with no hands is located; obtaining the locally stored layer configuration parameters, and determining display priorities of each hand graphic layer and the clock face layer based on the layer configuration parameters; overlaying the each hand graphic layer onto the clock face layer according to the display priorities to obtain a clock face image corresponding to the calibrated temporal information;

obtaining a background image issued by the video processor, overlaying the clock face image onto the background image to obtain display clock face data;

obtaining a data latency corresponding to the display clock face data, re-generating a new video synchronization signal based on the video synchronization signal and the data latency; and transmitting the new video synchronization signal and the display clock face data to the display screen.

Figure 3:
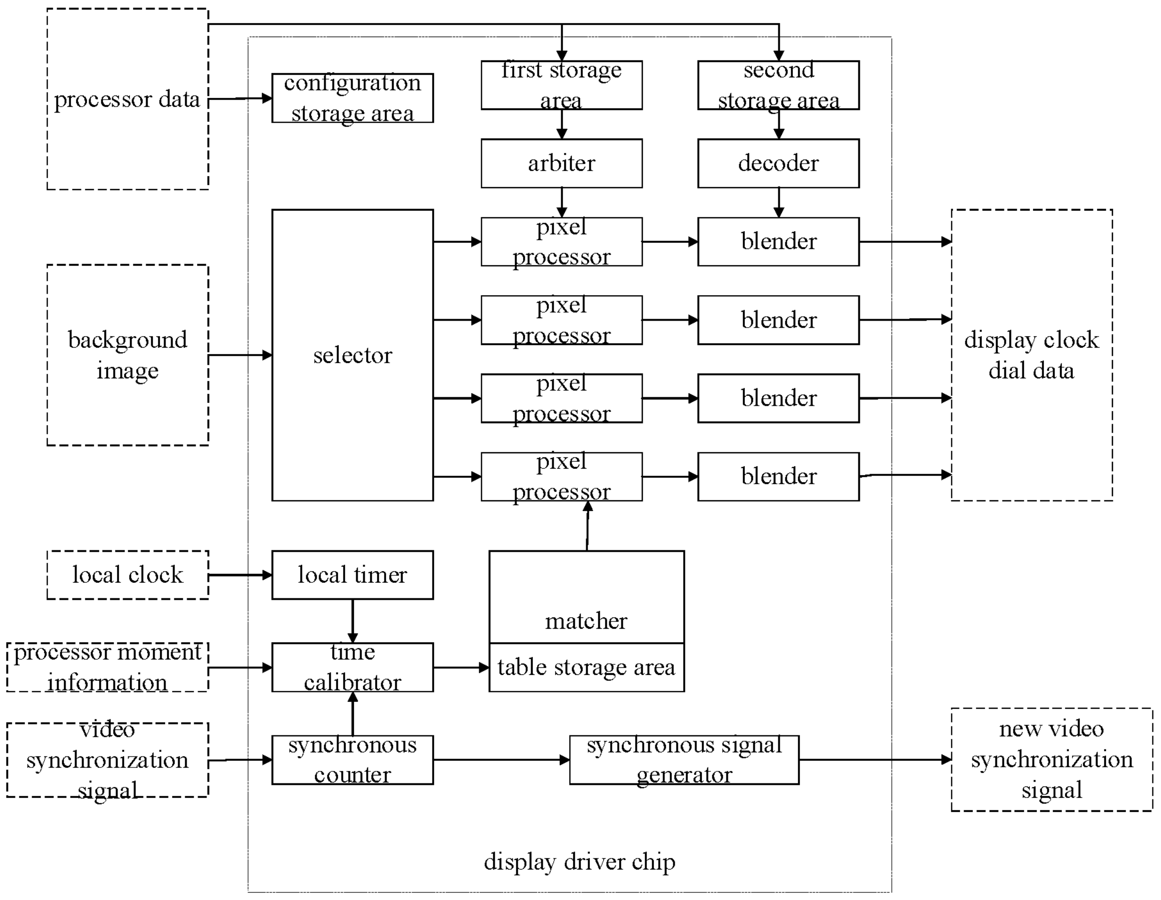
FIG. 3 is a schematic structural block diagram of a display driver chip according to an embodiment.

According to an embodiment, it is exemplary that a clock display method is applied to a display driver chip as shown in FIG. 3. The display driver chip communicates with a video processor. The display driver chip includes the following functions.

The display driver chip obtains a clock face image with no hands, an hour hand graphic, a minute hand graphic, a second hand graphic, layer configuration parameters and a table of angle-tempor correspondences which are issued by the video processor, stores the hour hand graphic, the minute hand graphic and the second hand graphic in a first local storage area, stores the clock face image with no hands in a second local storage area, stores the layer configuration parameters in a local configuration storage area, and stores the table of angle-tempor correspondences in a local table storage area.

A local timer obtains local temporal information of a local clock of the display driver chip. A time calibrator receives processor temporal information issued by the video processor. A synchronous counter obtains a video synchronization signal generated by a display screen. The time calibrator performs a time calibration based on the local temporal information, the processor temporal information and the video synchronization signal to obtain calibrated temporal information.

A matcher, e.g., a look up table matcher, obtains the table of angle-tempor correspondences from the local table storage area, and determines rotation angles of respective hand graphics corresponding to the calibrated temporal information according to correspondences between the rotation angles of the respective hand graphics and different time.

An arbiter obtains pixels of a hand graphic from the first storage area. A pixel processor rotates the pixels of each hand graphic based on the rotation angle of each hand graphic corresponding to the calibrated temporal information. A decoder obtains the clock face image with no hands from the second storage area and performs processing such as decoding and decompression. A blender performs anti-aliasing processing on each rotated hand graphic and the clock face image with no hands and obtains a hand graphic layer and a clock face layer. The blender also obtains the layer configuration parameters from the configuration storage area, determines display priorities of each hand graphic layer and the clock face layer based on the layer configuration parameters, overlays each hand graphic layer onto the clock face layer according to the display priorities to obtain a clock face image corresponding to the calibrated temporal information. A background image issued by the video processor is received by a selector, e.g., a pixel selector, and display clock face data is obtained by overlaying the clock face image onto the background image via the pixel processor and the blender. As shown in FIG. 3, four pixel processors each time read four pixels concurrently to perform rotation. The number of pixel processors is not limited to four, more pixel processors may be configured, and each pixel processor corresponds to one blender. The more the pixel processors, the higher the efficiency in concurrently processing pixels of the hand graphic.

A synchronous signal generator obtains a data latency corresponding to the display clock face data, and generates a new video synchronization signal based on the video synchronization signal received from the display screen and the data latency.

The display driver chip transmits the new video synchronization signal and the display clock face data to the display screen.

It is to be understood that, although steps in the flow charts involved in the above-mentioned embodiments are displayed in sequence based on indication of arrows, these steps are not necessarily executed sequentially based on the sequence indicated by the arrows. Unless otherwise explicitly specified herein, sequence to execute the steps is not strictly limited, and the steps may be executed in other sequences. In addition, at least some steps in in the flow charts involved in the above-mentioned embodiments may include multiple sub-steps or multiple stages, and these sub-steps or stages are not necessarily executed at the same moment, but may be executed at different time. These sub-steps or stages are not necessarily executed in sequence, but may be executed in turn or alternately with another step or at least a part of sub-steps or stages of another step.

Based on a same inventive concept, a clock display apparatus is provided according to an embodiment of the present disclosure, which may implement the above-mentioned clock display method. Solution to be provided by the apparatus is similar to solution described in the method. Therefore, specific limitations to the clock display apparatus according to one or more embodiments hereinafter may be understood with reference to limitations to the clock display method hereinabove, which are not repeated herein.

Figure 4:
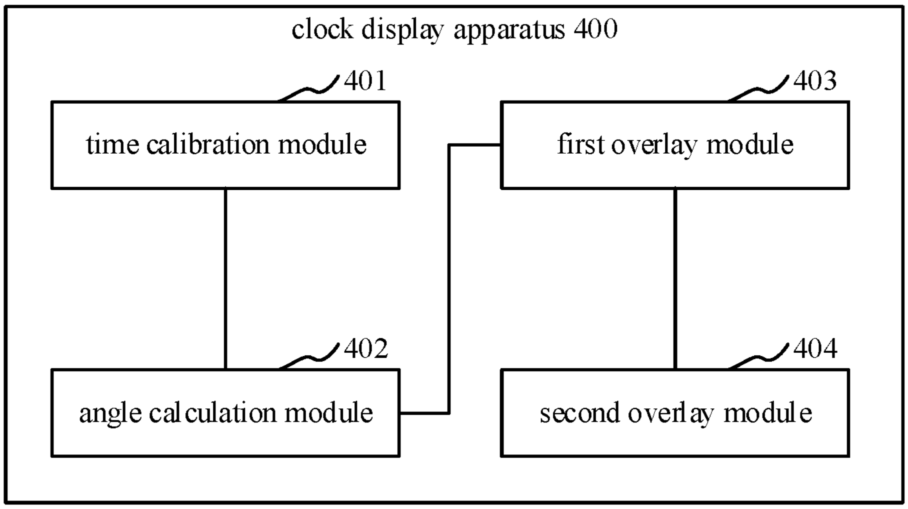
FIG. 4 is a structural block diagram of a clock display apparatus according to an embodiment.

According to an embodiment, as shown in FIG. 4, a clock display apparatus 400 is provided. The clock display apparatus 400 includes: a time calibration module 401, an angle calculation module 402, a first overlay module 403 and a second overlay module 404.

The time calibration module 401 is configured to perform a time calibration based on local temporal information and processor temporal information to obtain calibrated temporal information.

The angle calculation module 402 is configured to determine rotation angles of respective hand graphics that form a display clock face according to the calibrated temporal information.

The first overlay module 403 configured to: retrieve a clock face image with no hands and at least one hand graphic which are locally stored, overlay the at least one hand graphic onto the clock face image with no hands according to the rotation angle of each hand graphic, and obtain a clock face image corresponding to the calibrated temporal information.

The second overlay module 404 configured to: obtain a background image issued by a video processor, overlay the clock face image onto the background image to obtain display clock face data, then transmit the display clock face data to a display screen to show the calibrated temporal information.

According to an embodiment, the clock display apparatus further includes a rotation speed-up or slow-down mechanism, which is configured to, after retrieving the calibrated temporal information, update local hands position to main system time with noticeable abrupt change.

According to an embodiment, the angle calculation module 402 is further configured to: retrieve correspondences between rotation angles of respective hand graphics and different time from a locally stored table of angle-tempor correspondences, and determine the rotation angles of the respective hand graphics corresponding to the calibrated temporal information according to the correspondences between the rotation angles of the respective hand graphics and different time.

According to an embodiment, the first overlay module 403 is further configured to: rotate each hand graphic according to the rotation angle of the each hand graphic corresponding to the calibrated temporal information, perform anti-aliasing on each rotated hand graphic to obtain a hand graphic layer, determine a clock face layer in which the clock face image with no hands is located, and overlay each hand graphic layer onto the clock face layer to obtain the clock face image corresponding to the calibrated temporal information.

According to an embodiment, the first overlay module 403 is further configured to: obtain locally stored layer configuration parameters, determine display priorities of each hand graphic layer and the clock face layer based on the layer configuration parameters, and overlay the each hand graphic layer onto the clock face layer according to the display priorities.

According to an embodiment, the apparatus further includes:

an obtaining module, which is configured to obtain the clock face image with no hands, the at least one hand graphic, and the layer configuration parameters which are issued by the video processor, store the at least one hand graphic in a first local storage area, store the clock face image with no hands in a second local storage area, and store the layer configuration parameters in a local configuration storage area.

According to an embodiment, the time calibration module 401 is further configured to: obtain the local temporal information of a display driver chip, receive the processor temporal information issued by the video processor, obtain a video synchronization signal generated by the display screen, and perform the time calibration based on the local temporal information, the processor temporal information and the video synchronization signal to obtain the calibrated temporal information.

According to an embodiment, the second overlay module 404 is further configured to: obtain a data latency corresponding to the display clock face data, re-generate a new video synchronization signal based on the video synchronization signal and the data latency, and transmit the new video synchronization signal and the display clock face data to the display screen.

Modules in the above-mentioned clock display apparatus may be implemented in whole or in part by software, hardware, and a combination of hardware and software. The above-mentioned modules can be embedded in the form of hardware in a processor, or be independent from a processor in a computer device, or be stored in the form of software in a memory of a computer device, so as to make it easier for the processor to call and execute operations corresponding to the modules.

According to an embodiment, a computer device is provided. The computer device may be a terminal, whose internal structure may be referred to FIG. 5. The computer device includes a processor, a memory, an input/output interface, a communication interface, a display unit, and an input device. The processor, the memory and the input/output interface are connected via a system bus, and the communication interface, the display unit and the input device are connected to the system bus via the input/output interface. The processor of the computer device is configured to provide computing and control capabilities. The memory of the computer device includes a non-volatile storage medium and an internal memory. The non-volatile storage medium stores an operating system and computer programs. The internal memory provides an environment for running the operating system and computer programs stored in the non-volatile storage media. The input/output interface of the computer device is used for exchanging information between the processor and external devices. The communication interface of the computer device is used for wired or wireless communication with external terminals, where wireless communication may be achieved through Wi-Fi, mobile cellular networks, Near Field Communication (NFC), or other technologies. The computer program is executed by the processor to implement a clock display method. The display unit of the computer device is used to form a visually visible image, which may be a display screen, a projection device, or a virtual reality imaging device. The display screen may be a liquid crystal display screen or an e-ink screen. The input device of the computer device may be a touch layer covering the display screen, or may be a button, a trackball, or a touchpad disposed on a housing of the computer device, or may be an external keyboard, a touchpad, or a mouse or the like.

Figure 5:
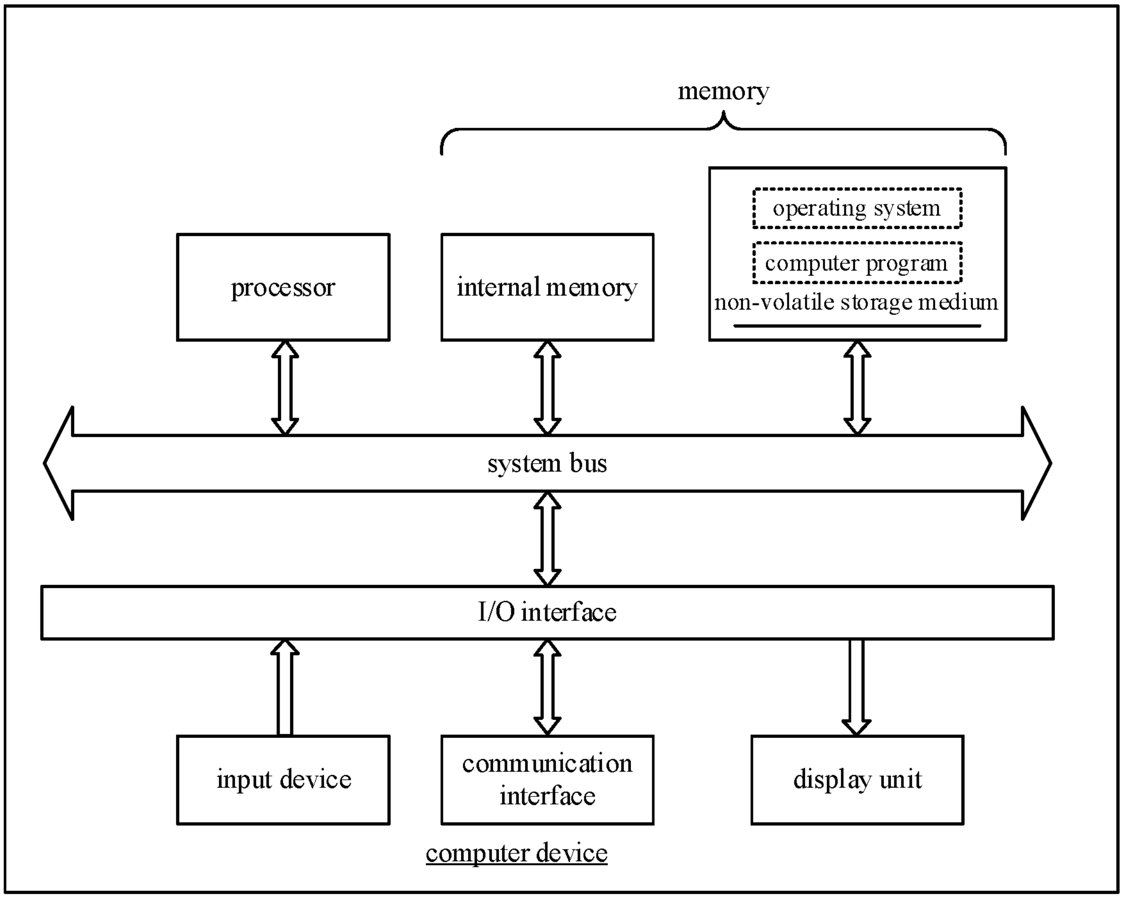
FIG. 5 schematically illustrates an internal structure of a computer device according to an embodiment.

Those with ordinary skills in the art should understand that the structure shown in FIG. 5 is only a block diagram of a part of a structure related to a solution of the present disclosure and does not limit the computer device to which the solution of the present disclosure is applied. Specifically, the computer device may include more or less members than those in FIG. 5, or include a combination of some members in FIG. 5, or include different member layouts in FIG. 5.

According to an embodiment, a computer device is provided, which includes a memory and a processor. A computer program is stored in the memory. The processor, when executing the computer program, implements: performing a time calibration based on local temporal information and processor temporal information to obtain calibrated temporal information; determining rotation angles of respective hand graphics that form a display clock face according to the calibrated temporal information; retrieving a clock face image with no hands and at least one hand graphic which are locally stored, overlaying the at least one hand graphic onto the clock face image with no hands according to the rotation angle of each hand graphic to obtain a clock face image corresponding to the calibrated temporal information; and obtaining a background image issued by a video processor, overlaying the clock face image onto the background image to obtain display clock face data, then transmitting the display clock face data to a display screen to show the calibrated temporal information.

According to an embodiment, the processor, when executing the computer program, further implements: retrieving correspondences between rotation angles of respective hand graphics and different time from a locally stored table of angle-tempor correspondences; determining the rotation angles of the respective hand graphics corresponding to the calibrated temporal information according to the correspondences between the rotation angles of the respective hand graphics and different time.

According to an embodiment, the processor, when executing the computer program, further implements: rotating each hand graphic according to the rotation angle of the each hand graphic corresponding to the calibrated temporal information, performing anti-aliasing on each rotated hand graphic to obtain a hand graphic layer, determining a clock face layer in which the clock face image with no hands is located, and obtaining the clock face image corresponding to the calibrated temporal information by overlaying each hand graphic layer onto the clock face layer.

According to an embodiment, the processor, when executing the computer program, further implements: obtaining locally stored layer configuration parameters, determining display priorities of each hand graphic layer and the clock face layer based on the layer configuration parameters, and overlaying the each hand graphic layer onto the clock face layer according to the display priorities.

According to an embodiment, the processor, when executing the computer program, further implements: obtaining the clock face image with no hands, the at least one hand graphic, and the layer configuration parameters which are issued by the video processor, storing the at least one hand graphic in a first local storage area, storing the clock face image with no hands in a second local storage area, and storing the layer configuration parameters in a local configuration storage area.

According to an embodiment, the processor, when executing the computer program, further implements: obtaining the local temporal information of the display driver chip, receiving the processor temporal information issued by the video processor, obtaining a video synchronization signal generated by the display screen, and performing the time calibration based on the local temporal information, the processor temporal information and the video synchronization signal to obtain the calibrated temporal information.

According to an embodiment, the processor, when executing the computer program, further implements: obtaining a data latency corresponding to the display clock face data, re-generating a new video synchronization signal based on the video synchronization signal and the data latency, and transmitting the new video synchronization signal and the display clock face data to the display screen.

According to an embodiment, the processor, when executing the computer program, further implements: after retrieving the calibrated temporal information, updating local hands position to main system time with noticeable abrupt change.

On the basis of the above-described embodiments, in actual implementation, the processor of the computer device may include a local driver circuit which can retrieve computer temporal data and execute computer communication function to achieve related processes as mentioned above.

According to an embodiment, a computer readable storage medium is provided, storing thereon a computer program. The computer program, when executed by a processor, causes the processor to implement: performing a time calibration based on local temporal information and processor temporal information to obtain calibrated temporal information; determining rotation angles of respective hand graphics that form a display clock face according to the calibrated temporal information; retrieving a clock face image with no hands and at least one hand graphic which are locally stored, overlaying the at least one hand graphic onto the clock face image with no hands according to the rotation angle of each hand graphic to obtain a clock face image corresponding to the calibrated temporal information; and obtaining a background image issued by a video processor, overlaying the clock face image onto the background image to obtain display clock face data, then transmitting the display clock face data to a display screen to show the calibrated temporal information.

According to an embodiment, the computer program, when executed by the processor, further causes the processor to implement: retrieving correspondences between rotation angles of respective hand graphics and different time from a locally stored table of angle-tempor correspondences; determining the rotation angles of the respective hand graphics corresponding to the calibrated temporal information according to the correspondences between the rotation angles of the respective hand graphics and different time.

According to an embodiment, the computer program, when executed by the processor, further causes the processor to implement: rotating each hand graphic according to the rotation angle of the each hand graphic corresponding to the calibrated temporal information, performing anti-aliasing on each rotated hand graphic to obtain a hand graphic layer, determining a clock face layer in which the clock face image with no hands is located, and obtaining the clock face image corresponding to the calibrated temporal information by overlaying each hand graphic layer onto the clock face layer.

According to an embodiment, the computer program, when executed by the processor, further causes the processor to implement: obtaining locally stored layer configuration parameters, determining display priorities of each hand graphic layer and the clock face layer based on the layer configuration parameters, and overlaying the each hand graphic layer onto the clock face layer according to the display priorities.

According to an embodiment, the computer program, when executed by the processor, further causes the processor to implement: obtaining the clock face image with no hands, the at least one hand graphic, and the layer configuration parameters which are issued by the video processor, storing the at least one hand graphic in a first local storage area, storing the clock face image with no hands in a second local storage area, and storing the layer configuration parameters in a local configuration storage area.

According to an embodiment, the computer program, when executed by the processor, further causes the processor to implement: obtaining the local temporal information of the display driver chip, receiving the processor temporal information issued by the video processor, obtaining a video synchronization signal generated by the display screen, and performing the time calibration based on the local temporal information, the processor temporal information and the video synchronization signal to obtain the calibrated temporal information.

According to an embodiment, the computer program, when executed by the processor, further causes the processor to implement: obtaining a data latency corresponding to the display clock face data, re-generating a new video synchronization signal based on the video synchronization signal and the data latency, and transmitting the new video synchronization signal and the display clock face data to the display screen.

According to an embodiment, the computer program, when executed by the processor, further causes the processor to implement: after retrieving the calibrated temporal information, update local hands position to main system time with noticeable abrupt change.

On the basis of the above-described embodiments, in actual implementation, the processor may include a local driver circuit.

According to an embodiment, a computer program product is provided, which includes a computer program. The computer program, when executed by a processor, causes the processor to implement: performing a time calibration based on local temporal information and processor temporal information to obtain calibrated temporal information; determining rotation angles of respective hand graphics that form a display clock face according to the calibrated temporal information; retrieving a clock face image with no hands and at least one hand graphic which are locally stored, overlaying the at least one hand graphic onto the clock face image with no hands according to the rotation angle of each hand graphic to obtain a clock face image corresponding to the calibrated temporal information; and obtaining a background image issued by a video processor, overlaying the clock face image onto the background image to obtain display clock face data, then transmitting the display clock face data to a display screen to show the calibrated temporal information.

According to an embodiment, the computer program, when executed by the processor, further causes the processor to implement: retrieving correspondences between rotation angles of respective hand graphics and different time from a locally stored table of angle-tempor correspondences; determining the rotation angles of the respective hand graphics corresponding to the calibrated temporal information according to the correspondences between the rotation angles of the respective hand graphics and different time.

According to an embodiment, the computer program, when executed by the processor, further causes the processor to implement: rotating each hand graphic according to the rotation angle of the each hand graphic corresponding to the calibrated temporal information, performing anti-aliasing on each rotated hand graphic to obtain a hand graphic layer, determining a clock face layer in which the clock face image with no hands is located, and obtaining the clock face image corresponding to the calibrated temporal information by overlaying each hand graphic layer onto the clock face layer.

According to an embodiment, the computer program, when executed by the processor, further causes the processor to implement: obtaining locally stored layer configuration parameters, determining display priorities of each hand graphic layer and the clock face layer based on the layer configuration parameters, and overlaying the each hand graphic layer onto the clock face layer according to the display priorities.

According to an embodiment, the computer program, when executed by the processor, further causes the processor to implement: obtaining the clock face image with no hands, the at least one hand graphic, and the layer configuration parameters which are issued by the video processor, storing the at least one hand graphic in a first local storage area, storing the clock face image with no hands in a second local storage area, and storing the layer configuration parameters in a local configuration storage area.

According to an embodiment, the computer program, when executed by the processor, further causes the processor to implement: obtaining the local temporal information of the display driver chip, receiving the processor temporal information issued by the video processor, obtaining a video synchronization signal generated by the display screen, and performing the time calibration based on the local temporal information, the processor temporal information and the video synchronization signal to obtain the calibrated temporal information.

According to an embodiment, the computer program, when executed by the processor, further causes the processor to implement: obtaining a data latency corresponding to the display clock face data, re-generating a new video synchronization signal based on the video synchronization signal and the data latency, and transmitting the new video synchronization signal and the display clock face data to the display screen.

It should be noted that, user information involved in the present disclosure (including, but not limited to, user device information, user personal information, and the like) and data (including, but not limited to, analyzed data, stored data, displayed data, and the like) refer to information and data which are authorized by the user or by all parties, and the collection, use and processing of relevant data need to comply with relevant laws, regulations and standards of relevant countries and regions.

Those with ordinary skill in the art may understand that all or some of the above-mentioned embodiments may be implemented by relevant hardware instructed by a computer program. The computer program may be stored in a non-volatile computer readable storage medium. When the computer program is executed, processes of the method according to foregoing embodiments may be implemented. Any references to a memory, a database, or another medium used in the various embodiments provided in the disclosure may include at least one of a non-volatile or a volatile memory. The nonvolatile Memory may include Read-Only Memory (ROM), magnetic tape, floppy disk, flash memory, optical memory, high-density embedded nonvolatile memory, Resistive Random Access Memory (ReRAM), Magnetic Random Access Memory (MRAM), Ferroelectric Random Access Memory (FRAM), Phase Change Memory (PCM), graphene memory, and the like. Volatile memory may include Random Access Memory (RAM), external cache, and the like. By way of illustration and not limitation, RAM may take many forms such as Static Random Access Memory (SRAM) or Dynamic Random Access Memory (DRAM). The databases referred in various embodiments provided herein may include at least one of relational or non-relational databases. The non-relational database may include, but is not limited to, a block chain based distributed database, and the like. The processors referred in the embodiments provided herein may be, but is not limited to, general purpose processors, central processing units, graphics processors, digital signal processors, programmable logic devices, quantum computing based data processing logic devices, and the like.

Technical features of the above-mentioned embodiments may be freely combined. To be brief in description, not all possible combinations of the technical features in the above-mentioned embodiments are described. However, the combinations of these technical features should be considered to fall within the scope of this specification as long as these combinations are not contradictory.

The above-mentioned embodiments only represent several embodiments of this disclosure, and their descriptions are specific and detailed, but should not be understood as limiting the scope of this disclosure. It should be noted that, several modifications and improvements can be made by those of ordinary skill in the art without departing from the concept of this disclosure, which belong to the protection scope of this disclosure. Therefore, it is intended that the protection scope of this disclosure shall be subjected to the appended claims.

What is claimed is:

1. A clock display method, applied to a display driver chip for a display screen, the display driver chip being communicative with a video processor, wherein the clock display method comprises:

performing a time calibration based on local temporal information and processor temporal information and obtaining calibrated temporal information;

determining rotation angles of respective hand graphics that form a display clock face according to the calibrated temporal information;

retrieving a clock face image with no hands and at least one hand graphic which are locally stored, overlaying the at least one hand graphic onto the clock face image with no hands according to the rotation angle of each hand graphic and obtaining a clock face image corresponding to the calibrated temporal information;

obtaining a background image issued by the video processor, overlaying the clock face image onto the background image to obtain display clock face data, then transmitting the display clock face data to the display screen to show the calibrated temporal information;

wherein the performing the time calibration based on the local temporal information and the processor temporal information and obtaining the calibrated temporal information comprise:

obtaining the local temporal information of the display driver chip, receiving the processor temporal information issued by the video processor, and obtaining a video synchronization signal generated by the display screen;

performing the time calibration based on the local temporal information, the processor temporal information and the video synchronization signal and obtaining the calibrated temporal information.

2. The clock display method of claim 1, wherein the determining the rotation angles of the respective hand graphics that form the display clock face according to the calibrated temporal information comprises:

retrieving correspondences between the rotation angles of the respective hand graphics and different time from a locally stored table of angle-tempor correspondences; and determining the rotation angles of the respective hand graphics corresponding to the calibrated temporal information according to the correspondences between the rotation angles of the respective hand graphics and different time.

3. The clock display method of claim 2, wherein the overlaying the at least one hand graphic onto the clock face image with no hands according to the rotation angle of each hand graphic and obtaining the clock face image corresponding to the calibrated temporal information comprise:

rotating each hand graphic according to the rotation angle of the each hand graphic corresponding to the calibrated temporal information, and performing anti-aliasing on each rotated hand graphic to obtain a hand graphic layer;

determining a clock face layer in which the clock face image with no hands is located, and obtaining the clock face image corresponding to the calibrated temporal information by overlaying each hand graphic layer onto the clock face layer.

4. The clock display method of claim 3, wherein the overlaying the each hand graphic layer onto the clock face layer comprises:

obtaining locally stored layer configuration parameters, and determining display priorities of the each hand graphic layer and the clock face layer based on the layer configuration parameters;

overlaying the each hand graphic layer onto the clock face layer according to the display priorities.

5. The clock display method of claim 4, further comprising:

obtaining the clock face image with no hands, the at least one hand graphic and the layer configuration parameters which are all issued by the video processor;

storing the at least one hand graphic in a first local storage area, storing the clock face image with no hands in a second local storage area, and storing the layer configuration parameters in a local configuration storage area.

6. The clock display method of claim 1, wherein prior to the transmitting the display clock face data to the display screen, the clock display method further comprises:

obtaining a data latency corresponding to the display clock face data;

re-generating a new video synchronization signal based on the video synchronization signal and the data latency;

wherein the transmitting the display clock face data to the display screen comprises:

transmitting the new video synchronization signal and the display clock face data to the display screen.

7. A computer device, comprising a memory and a processor, wherein a computer program is stored in the memory, and the processor, when executing the computer program, implement:

performing a time calibration based on local temporal information and processor temporal information and obtaining calibrated temporal information;

determining rotation angles of respective hand graphics that form a display clock face according to the calibrated temporal information;

retrieving a clock face image with no hands and at least one hand graphic which are locally stored, overlaying the at least one hand graphic onto the clock face image with no hands according to the rotation angle of each hand graphic and obtaining a clock face image corresponding to the calibrated temporal information;

obtaining a background image issued by the video processor, overlaying the clock face image onto the background image to obtain display clock face data, then transmitting the display clock face data to the display screen to show the calibrated temporal information;

wherein the performing the time calibration based on the local temporal information and the processor temporal information and obtaining the calibrated temporal information comprise:

obtaining the local temporal information of the display driver chip, receiving the processor temporal information issued by the video processor, and obtaining a video synchronization signal generated by the display screen;

performing the time calibration based on the local temporal information, the processor temporal information and the video synchronization signal and obtaining the calibrated temporal information.

8. The computer device of claim 7, wherein the determining the rotation angles of the respective hand graphics that form the display clock face according to the calibrated temporal information comprises:

retrieving correspondences between the rotation angles of the respective hand graphics and different time from a locally stored table of angle-tempor correspondences; and determining the rotation angles of the respective hand graphics corresponding to the calibrated temporal information according to the correspondences between the rotation angles of the respective hand graphics and different time.

9. The computer device of claim 8, wherein the overlaying the at least one hand graphic onto the clock face image with no hands according to the rotation angle of each hand graphic and obtaining the clock face image corresponding to the calibrated temporal information comprise:

rotating each hand graphic according to the rotation angle of the each hand graphic corresponding to the calibrated temporal information, and performing anti-aliasing on each rotated hand graphic to obtain a hand graphic layer;

determining a clock face layer in which the clock face image with no hands is located, and obtaining the clock face image corresponding to the calibrated temporal information by overlaying each hand graphic layer onto the clock face layer.

10. The computer device of claim 9, wherein the overlaying the each hand graphic layer onto the clock face layer comprises:

obtaining locally stored layer configuration parameters, and determining display priorities of the each hand graphic layer and the clock face layer based on the layer configuration parameters;

overlaying the each hand graphic layer onto the clock face layer according to the display priorities.

11. The computer device of claim 10, wherein the processor, when executing the computer program, further implement:

obtaining the clock face image with no hands, the at least one hand graphic and the layer configuration parameters which are all issued by the video processor;

storing the at least one hand graphic in a first local storage area, storing the clock face image with no hands in a second local storage area, and storing the layer configuration parameters in a local configuration storage area.

12. The computer device of claim 7, wherein prior to the transmitting the display clock face data to the display screen, the processor, when executing the computer program, further implement:

obtaining a data latency corresponding to the display clock face data;

re-generating a new video synchronization signal based on the video synchronization signal and the data latency;

wherein the transmitting the display clock face data to the display screen comprises:

transmitting the new video synchronization signal and the display clock face data to the display screen.

13. A non-transitory computer readable storage medium, which stores a computer program thereon, wherein the computer program, when executed by a processor, causes the processor to implement:

performing a time calibration based on local temporal information and processor temporal information and obtaining calibrated temporal information;

determining rotation angles of respective hand graphics that form a display clock face according to the calibrated temporal information;

retrieving a clock face image with no hands and at least one hand graphic which are locally stored, overlaying the at least one hand graphic onto the clock face image with no hands according to the rotation angle of each hand graphic and obtaining a clock face image corresponding to the calibrated temporal information;

obtaining a background image issued by the video processor, overlaying the clock face image onto the background image to obtain display clock face data, then transmitting the display clock face data to the display screen to show the calibrated temporal information, wherein the performing the time calibration based on the local temporal information and the processor temporal information and obtaining the calibrated temporal information comprise:

obtaining the local temporal information of the display driver chip, receiving the processor temporal information issued by the video processor, and obtaining a video synchronization signal generated by the display screen;

performing the time calibration based on the local temporal information, the processor temporal information and the video synchronization signal and obtaining the calibrated temporal information.

14. The computer readable storage medium of claim 13, wherein the determining the rotation angles of the respective hand graphics that form the display clock face according to the calibrated temporal information comprises:

retrieving correspondences between the rotation angles of the respective hand graphics and different time from a locally stored table of angle-tempor correspondences; and determining the rotation angles of the respective hand graphics corresponding to the calibrated temporal information according to the correspondences between the rotation angles of the respective hand graphics and different time.

15. The computer readable storage medium of claim 14, wherein the overlaying the at least one hand graphic onto the clock face image with no hands according to the rotation angle of each hand graphic and obtaining the clock face image corresponding to the calibrated temporal information comprise:

rotating each hand graphic according to the rotation angle of the each hand graphic corresponding to the calibrated temporal information, and performing anti-aliasing on each rotated hand graphic to obtain a hand graphic layer;

determining a clock face layer in which the clock face image with no hands is located, and obtaining the clock face image corresponding to the calibrated temporal information by overlaying each hand graphic layer onto the clock face layer.

16. The computer readable storage medium of claim 15, wherein the overlaying the each hand graphic layer onto the clock face layer comprises:

obtaining locally stored layer configuration parameters, and determining display priorities of the each hand graphic layer and the clock face layer based on the layer configuration parameters;

overlaying the each hand graphic layer onto the clock face layer according to the display priorities.

17. The computer readable storage medium of claim 16, wherein the computer program, when executed by the processor, further causes the processor to implement:

obtaining the clock face image with no hands, the at least one hand graphic and the layer configuration parameters which are all issued by the video processor;

storing the at least one hand graphic in a first local storage area, storing the clock face image with no hands in a second local storage area, and storing the layer configuration parameters in a local configuration storage area.

* * * * *